United States Patent
Tokumoto et al.

(10) Patent No.: US 7,533,583 B2
(45) Date of Patent: May 19, 2009

(54) TORQUE DETECTING APPARATUS

(75) Inventors: Yoshitomo Tokumoto, Nabari (JP);
Toshiharu Ishihara, Kashiwara (JP);
Naoki Nakane, Toyota (JP)

(73) Assignees: JTEKT Corporation, Osaka (JP);
Denso Corporation, Aichi (JP)

( * ) Notice: Subject to any disclaimer, the term of this patent is extended or adjusted under 35 U.S.C. 154(b) by 99 days.

(21) Appl. No.: 11/569,227

(22) PCT Filed: May 16, 2005

(86) PCT No.: PCT/JP2005/008877

§ 371 (c)(1),
(2), (4) Date: Nov. 16, 2006

(87) PCT Pub. No.: WO2005/111565

PCT Pub. Date: Nov. 24, 2005

(65) Prior Publication Data

US 2008/0092670 A1    Apr. 24, 2008

(30) Foreign Application Priority Data

May 17, 2004    (JP)    ............................. 2004-146757

(51) Int. Cl.
*G01L 3/02* (2006.01)
(52) U.S. Cl. ................................. 73/862.331
(58) Field of Classification Search ..............................
73/862.331–862.333
See application file for complete search history.

(56) References Cited

U.S. PATENT DOCUMENTS

| 5,705,756 | A  | * | 1/1998 | LeMarquand et al. .. 73/862.332 |
| 6,868,743 | B2 |   | 3/2005 | Nakane et al. |
| 6,880,411 | B2 | * | 4/2005 | Nakane et al. ......... 73/862.331 |
| 2002/0189371 | A1 | | 12/2002 | Nakane et al. |
| 2003/0209087 | A1 | | 11/2003 | Nakane et al. |
| 2004/0011138 | A1 | | 1/2004 | Gandel et al. |

FOREIGN PATENT DOCUMENTS

| JP | 3-48714 U | 5/1991 |
| JP | 2003-149062 A | 5/2003 |
| JP | 2004-163303 A | 6/2004 |
| JP | 2004-163304 A | 6/2004 |

* cited by examiner

*Primary Examiner*—Max Noori
(74) *Attorney, Agent, or Firm*—Darby & Darby P.C.

(57) ABSTRACT

Magnetic pole nails 51, 51 ... aligned on magnetic yokes 5, 5 that integrally rotate with the second shaft 2 are formed in a rectangular shape, and the circumferential width and alignment pitch of the magnetic pole nails 51, 51 ... are appropriately determined with respect to the magnetization pitch of the N-poles 40, 40 ... and the S-poles 41, 41 ... circumferentially aligned on the cylindrical magnet 4 that integrally rotates with the first shaft 1, so that a variation in magnetic flux generated on the magnetic yoke 5, 5 in accordance with the relative displacement between the cylindrical magnet 4 and the magnetic yoke 5, 5 uniformly takes place in a larger amplitude. Thus, a torque detecting apparatus that achieves higher detection accuracy with a simple structure can be provided.

2 Claims, 7 Drawing Sheets

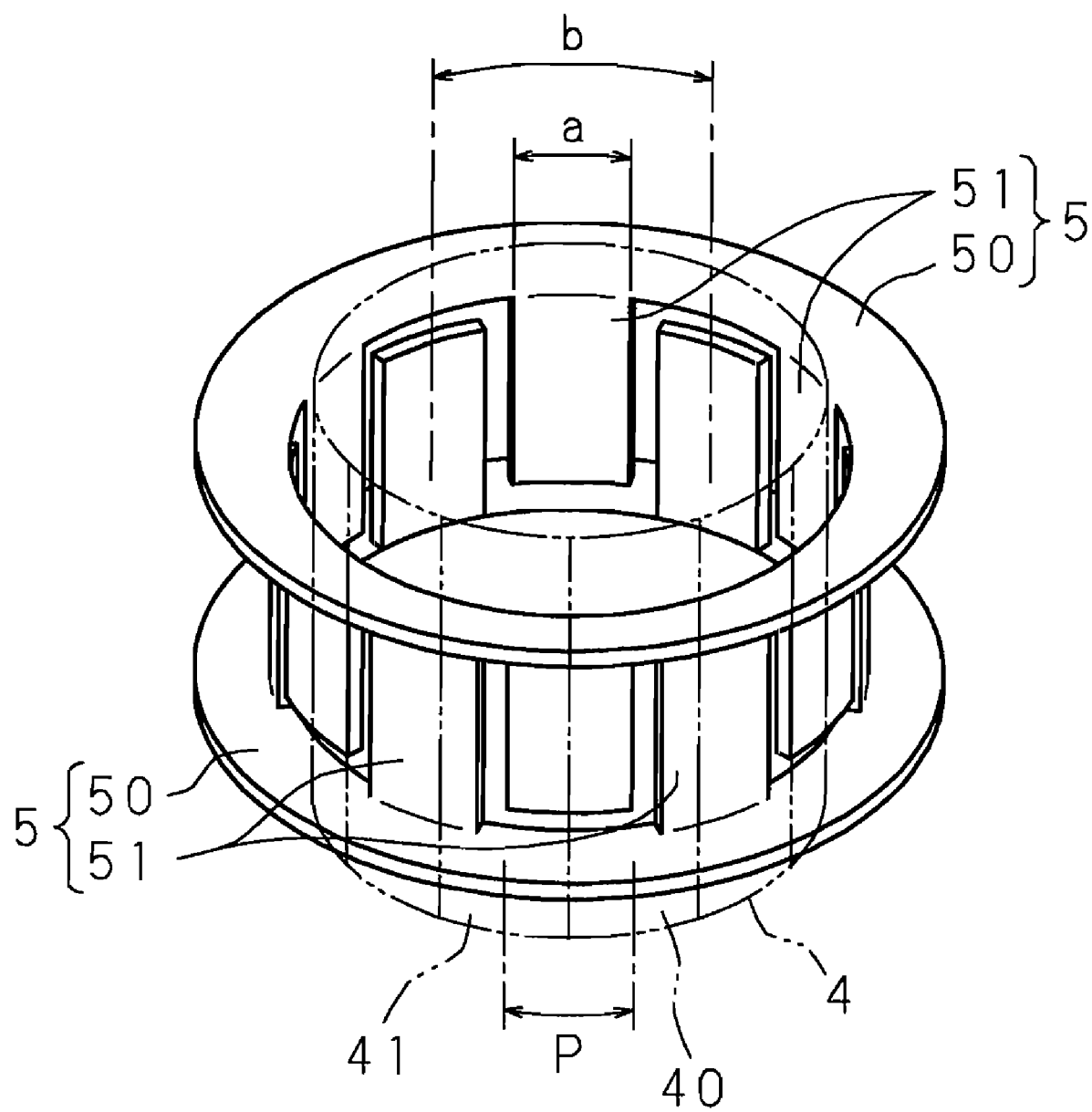

PRIOR ART

TORQUE DETECTING APPARATUS

TECHNICAL FIELD

The present invention relates to a torque detecting apparatus to be used for detecting a steering torque applied to a steering member, for example in an electric power steering apparatus.

BACKGROUND ART

In an electric power steering apparatus that drives a motor for steering assistance in accordance with a rotational operation of a steering member such as a steering wheel and transmits the rotational force of the motor to a steering mechanism thus to assist the steering, a steering torque applied to the steering member has to be detected for the drive control of the motor for steering assistance, and for such detection a torque detecting apparatus has been conventionally employed halfway of a steering shaft connecting the steering member and the steering mechanism.

In the torque detecting apparatus, the steering shaft, which is the object of the detection, is split into a first shaft and a second shaft coaxially connected via a torsion bar of a reduced diameter, so that when a steering torque is applied to the steering shaft by a rotational operation of the steering member, a relative angular displacement is created between the first and the second shaft along with distortion of the torsion bar caused by the effect of the steering torque, and the steering torque is detected based on the relative angular displacement.

The detection of the relative angular displacement between the first and the second shaft has been executed by various means, one of which is found in a torque detecting apparatus that includes a cylindrical magnet that integrally rotates with the first shaft and a magnetic yoke that integrally rotates with the second shaft, so as to detect the relative angular displacement utilizing a variation of a magnetic circuit between the cylindrical magnet and the magnetic yoke (For example, refer to Patent Document 1).

The cylindrical magnet that integrally rotates with the first shaft is constituted as a multi-pole magnet including a plurality of magnetic poles circumferentially aligned thereon, and is coaxially fixed to the first shaft. The magnetic yoke that integrally rotates with the second shaft includes a plurality of magnetic pole nails circumferentially aligned on a ring-shaped yoke element so as to axially extend in an axial direction, such that two of such yoke elements with the magnetic pole nails alternately aligned in a circumferential direction constitute a pair, and are positioned such that each of the magnetic pole nails falls on a boundary between the poles (N-pole and S-pole) of the cylindrical magnet.

Under such structure, when the relative angular displacement is created between the first shaft and the second shaft, the circumferential positional relationship of the magnetic pole nails of the paired magnetic yokes that integrally rotate with the second shaft changes with respect to the magnetic poles of the cylindrical magnet that integrally rotates with the first shaft, in an opposite direction to each other, which creates a change in magnetic flux generated in the respective magnetic yokes, and detecting such change by a magnetic sensor constituted of a magnetosensitive element such as a hall element enables detecting the torque applied to the first and the second shaft (steering torque).

Patent Document 1: Japanese Patent Application Laid-Open No. 2003-149062

DISCLOSURE OF THE INVENTION

Problems to be Solved by the Invention

FIGS. 6(a) and 6(b) are diagrams for explaining an operation of the conventional torque detecting apparatus disclosed in the Patent Document 1, showing circumferential positional relationships between the cylindrical magnet and the magnetic yoke extended on a plane. FIG. 6(a) represents the positional relationship at the time of assembly, in which the cylindrical magnet 8 and the magnetic yoke 9, 9 are circumferentially positioned such that the plurality of magnetic pole nails 91, 91 . . . provided on the respective magnetic yokes 9, 9 falls on the boundary between a N-pole 80 and a S-pole 81 circumferentially aligned on the cylindrical magnet 8.

Under such state, the magnetic pole nails 91, 91 . . . of the two magnetic yokes 9, 9 are positioned under an equal condition in the magnetic field generated between the adjacently disposed N-pole 80 and S-pole 81 along the circumference of the cylindrical magnet 8, and hence the number of magnetic field lines flowing into and out of those magnetic pole nails 91, 91 . . . become generally equal, and the magnetic flux generated on the yoke elements 90, 90 of the two magnetic yokes 9, 9 . . . becomes equal.

When the cylindrical magnet 8 and the magnetic yokes 9, 9 thus configured are relatively displaced circumferentially, the positional relationship between the N-pole 80 and the S-pole 81 of the cylindrical magnet 8 and the respective magnetic pole nails 91, 91 . . . of the two magnetic yokes 9, 9 is shifted in mutually opposite directions, such that the magnetic pole nails 91, 91 . . . of one of the magnetic yokes 9 overlaps with the N-pole 80 in a larger area, while the magnetic pole nails 91, 91 . . . of the other magnetic yoke 9 overlaps with the S-pole 81 in a larger area. Accordingly, a positive and a negative magnetic flux are respectively generated on the yoke elements 90, 90 of the magnetic yokes 9, 9, and detecting the change of the magnetic flux enables detecting the relative displacement between the cylindrical magnet 8 and the magnetic yoke 9, 9, i.e. the torque creating the relative displacement.

Such change of the magnetic flux is created in a same direction until a state shown in FIG. 6(b) is reached, in other words until the magnetic pole nails 91, 91 . . . of one of the magnetic yokes 9 reach the centerline of the N-poles 80, 80 . . . and the magnetic pole nails 91, 91 . . . of the other magnetic yoke 9 reach the centerline of the S-poles 81, 81 . . . , which permits detecting the torque within such range.

In the torque detecting apparatus disclosed in the Patent Document 1, however, since the magnetic pole nails 91, 91 . . . of the magnetic yokes 9, 9 are of an isosceles triangular shape having its bottom along the joint line with the yoke element 90 and tapered toward the top as shown in FIGS. 6(a) and 6(b), the overlapping area between the magnetic pole nails 91, 91 . . . and the N-pole 80 or S-pole 81 does not uniformly increase or decrease according to the relative displacement between the cylindrical magnet 8 and the magnetic yoke 9, 9, over the range from the neutral position shown in FIG. 6(a) to the final position shown in FIG. 6(b).

Accordingly, the output of the magnetic sensor detecting the change of the magnetic flux between the magnetic yokes 9, 9 presents a non-linear transition, in which the change rate is greater in a range close to the neutral position but reduced at a position closer to the final position, as shown in FIG. 7. In order to improve the detection accuracy of the torque obtained based on such change of the output, the change rate has to be accurately controlled over the entire detection range. For such purpose it is necessary to fabricate each of the magnetic pole nails 91, 91 . . . of the magnetic yokes 9, 9 with extremely high accuracy in shape and position, which leads to an increase in number of processing steps and assembling steps, thereby incurring an increase in cost of the product.

In order to improve the torque detection accuracy, it might be an option to employ only the output in the vicinity of the neutral position where the transition is generally uniform, out of the output of the magnetic sensor obtained as shown in FIG. 7. In this case, however, the amplitude of the change of the output of the magnetic sensor is reduced and hence the detection sensitivity is degraded, which leads to increased vulnerability against magnetic noise and, therefore, to failure in achieving higher detection accuracy.

The present invention has been achieved in view of the foregoing situation, with an object to provide a torque detecting apparatus in which magnetic pole nails aligned on a magnetic yoke are optimally formed in shape and dimensions and appropriately positioned, so as to achieve higher detection accuracy without incurring an increase in number of processing and assembling steps.

Means for Solving the Problems

The present invention provides a torque detecting apparatus comprising a first shaft and a second shaft coaxially connected via a torsion bar; a cylindrical magnet that integrally rotates with the first shaft, including a plurality of magnetic poles circumferentially aligned in a predetermined magnetization pitch; and a set of magnetic yokes that integrally rotate with the second shaft, respectively including a plurality of magnetic pole nails alternately aligned circumferentially in a magnetic field generated on an outer side of the cylindrical magnet; wherein the magnetic pole nails are of a rectangular shape having a circumferential width slightly smaller than the magnetization pitch of the cylindrical magnet, and are circumferentially aligned on the magnetic yoke in a pitch generally twice as wide as the magnetization pitch.

According to the present invention, the magnetic pole nails aligned on the magnetic yoke are formed in a rectangular shape having a uniform circumferential width along an entire axial length thereof, in appropriate dimensions with respect to the magnetization pitch of the magnetic poles on the cylindrical magnet, so that a circumferential relative displacement of the magnetic yoke with respect to the cylindrical magnet produces a uniform change in overlapping area between the cylindrical magnet and the magnetic pole, so as to create a uniform change of magnetic flux between the magnetic yokes over the entire detection range according to the change in overlapping area, and obtain a greater change rate of the magnetic flux, thereby achieving higher detection sensitivity.

Effects of the Invention

In the torque detecting apparatus according to the present invention, the magnetic pole nails aligned on the set of magnetic yokes that are to be relatively displaced with respect to the cylindrical magnet are formed in a rectangular shape, and the position and dimensions of the magnetic pole nails are determined based on the magnetization pitch of the magnetic poles circumferentially aligned on the cylindrical magnet. Thus, the present invention offers prominent advantages that the change of the magnetic flux between the magnetic yokes created by the action of the torque presents a uniform transition with greater amplitude of change, which permits detecting the torque with higher accuracy based on the detection result of the change of the magnetic flux.

BRIEF DESCRIPTION OF THE DRAWINGS

FIG. 3 is a perspective view showing a magnetic yoke;

DESCRIPTION OF THE NUMERALS

Figure 1:
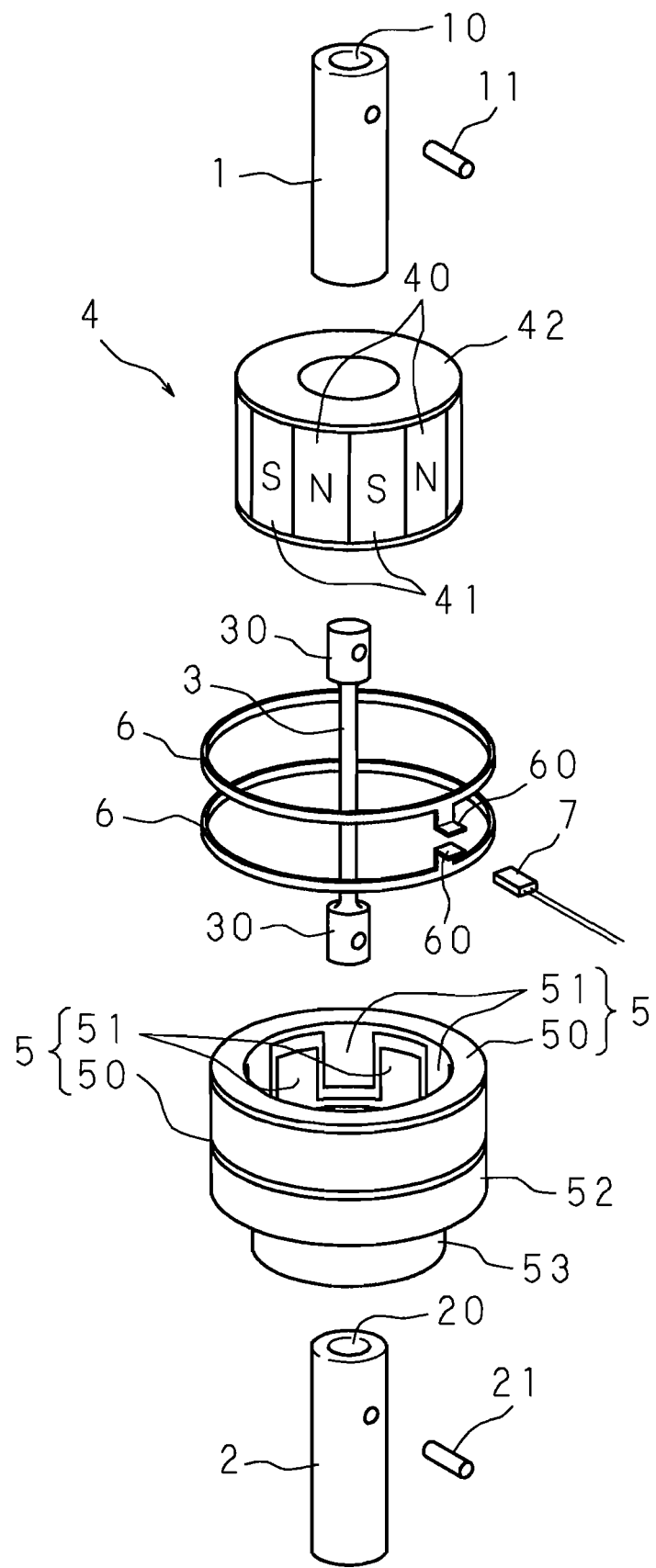
FIG. 1 is an exploded perspective view showing a torque detecting apparatus according to the present invention.

1 first shaft
2 second shaft
3 torsion bar
4 cylindrical magnet
5 magnetic yoke
40 N-pole (magnetic pole)
41 S-pole (magnetic pole)
51 magnetic pole nail

BEST MODE FOR IMPLEMENTING THE INVENTION

Figure 2:
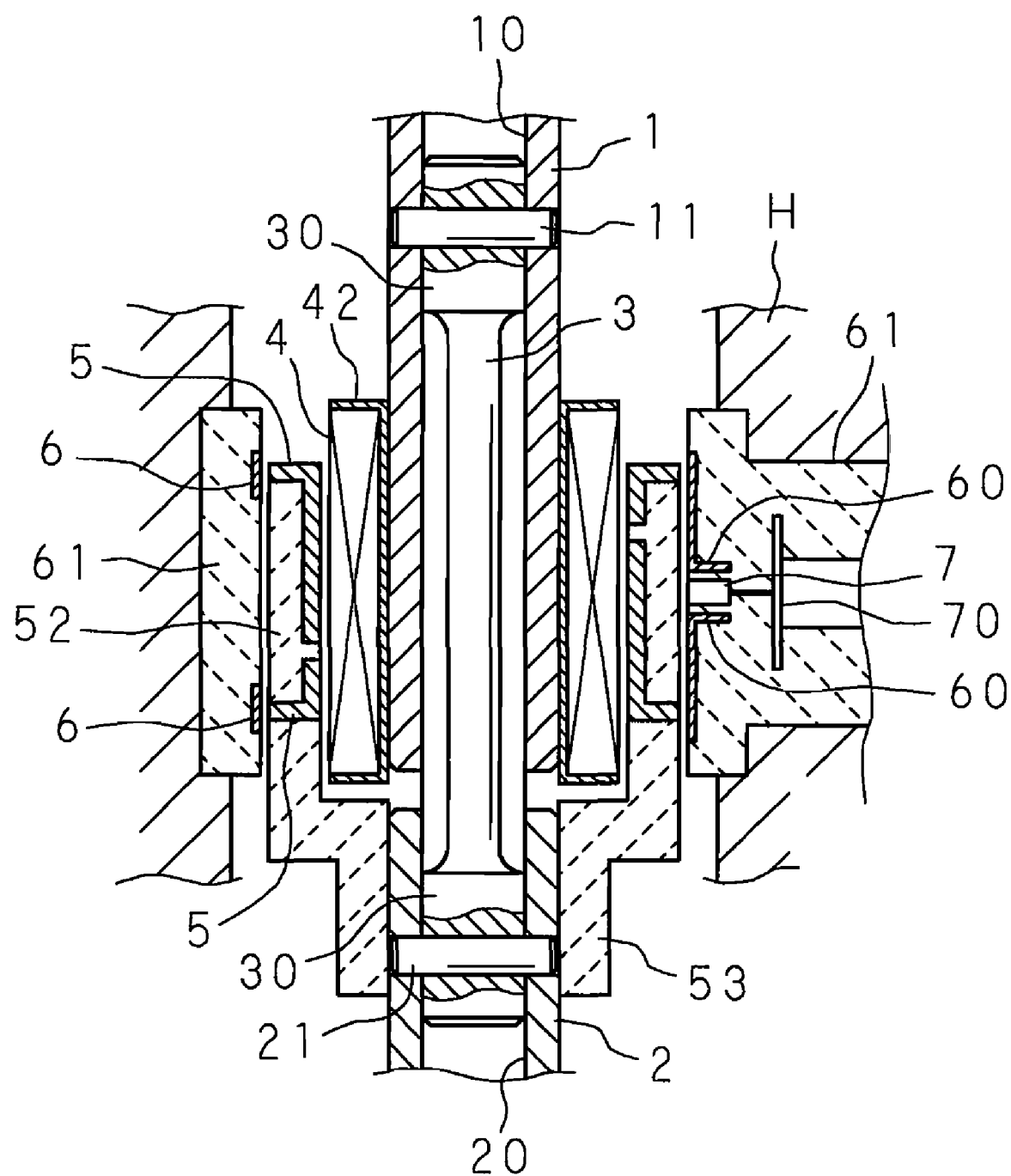
FIG. 2 is a vertical cross-sectional view showing an assembled state of the torque detecting apparatus according to the present invention.

Hereunder, the present invention will be described in details based on the drawings showing an embodiment thereof. FIG. 1 is an exploded perspective view showing a torque detecting apparatus according to the present invention, and FIG. 2 is a vertical cross-sectional view showing an assembled state thereof.

The torque detecting apparatus according to the present invention serves to detect a torque applied to a first shaft 1 and a second shaft 2 coaxially connected via a torsion bar 3, and includes a cylindrical magnet 4 that integrally rotates with the first shaft 1, a pair of magnetic yokes 5, 5 that integrally rotate with the second shaft 2, and also magnetic focusing rings 6, 6 fixedly disposed so as to respectively surround the outer side of the magnetic yokes 5, 5 to collect the magnetic flux generated in the respective magnetic yokes 5, 5, and a magnetic sensor 7 disposed between the magnetic focusing rings 6, 6.

The torsion bar 3 includes a round bar of a minor diameter, and short joint portions 30, 30 of a major diameter coupled to the respective ends of the round bar, for connection to the first shaft 1 and the second shaft 2. The first shaft 1 and the second shaft 2 respectively include along its axial line a joint hole 10, 20 in which the joint portion 30, 30 can be insert-fitted, so that the first shaft 1 and the second shaft 2 can be coupled to the torsion bar 3 by insert-fitting the joint portions 30, 30 on the respective ends of the torsion bar 3 into the joint hole 10, 20 of the first shaft 1 and the second shaft 2 respectively, and hammering joint pins 11, 21 into the first shaft 1 and the second shaft 2 respectively, thus constituting an integral structure.

When a rotational torque is applied to the first shaft 1 and the second shaft coupled as above, the torsion bar 3 is torsionally deformed by the action of the rotational torque, and a relative angular displacement is created between the first shaft 1 and the second shaft 2, in accordance with the torsional angle of the torsion bar 3. The magnitude of the relative angular displacement is uniquely determined by a torsion spring constant of the torsion bar 3 acting as a torsion spring, and is proportionate to the magnitude of the torque.

As shown in FIG. 1, the cylindrical magnet 4 that integrally rotates with the first shaft 1 is constituted as a multi-pole magnet including a plurality of N-poles 40, 40 . . . and S-poles 41, 41 . . . alternately aligned circumferentially, with the end faces and inner surface thereof coated with a molded resin 42 of an appropriate thickness, and is fixedly fitted coaxially to the first shaft 1 via the molded resin 42.

The pair of magnetic yokes 5, 5 that integrally rotate with the second shaft 2 are, as shown in FIG. 1, components of a magnetic material respectively constituted of a ring-shaped yoke element 50 including a plurality of axially extending magnetic pole nails 51, 51 . . . circumferentially aligned at regular intervals. The magnetic yokes 5, 5 are mutually positioned such that the tip portions of the magnetic pole nails 51, 51 . . . oppose each other and are alternately aligned circumferentially, and unified by a cylindrically formed molded resin 52 that covers the outer face of the magnetic yokes 5, 5, and then fixedly fitted coaxially to an end portion of the second shaft 2 via a boss portion 53 extended in one direction from the molded resin 52.

The magnetic yokes 5, 5 thus fixed are, as shown in FIG. 2, assembled at such a position that the inner surface of the respective yokes including the magnetic pole nails 51, 51 . . . confront the outer circumferential surface of the cylindrical magnet 4 fixedly fitted to the first shaft 1 with a fine airgap therebetween, once the first shaft 1 and the second shaft 2 are coupled via the torsion bar 3.

The feature of the torque detecting apparatus according to the present invention lies in the shape and dimensions of the magnetic pole nails 51, 51 . . . provided on the magnetic yoke 5, 5 configured as above. FIG. 3 is a perspective view showing the magnetic yoke 5, 5, assembled as described above to attain the positional relationship with respect to the cylindrical magnet 4 indicated by dash-dot-dot lines in FIG. 3.

As shown in FIG. 3, the magnetic pole nails 51, 51 . . . of the magnetic yokes 5, 5 are of a rectangular shape having a predetermined circumferential width "a" that is constant over the entire length there of from the joint line with the yoke element 50, 50 to the top portion thereof, and circumferentially aligned on the yoke element 50, 50 in a predetermined alignment pitch "b".

Figure 4A:
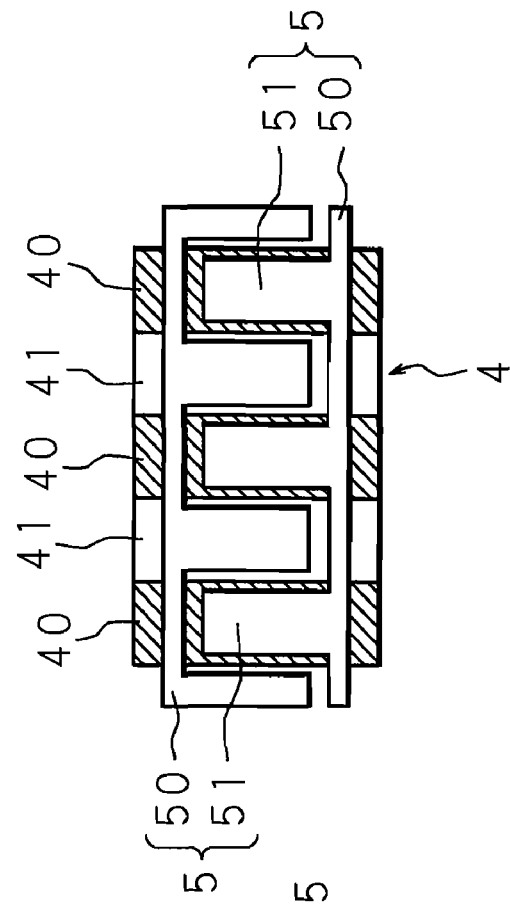
FIGS. 4(*a*) and 4(*b*) are explanatory drawings showing a circumferential positional relationship between a magnetic yoke and the cylindrical magnet.
Figure 4B:
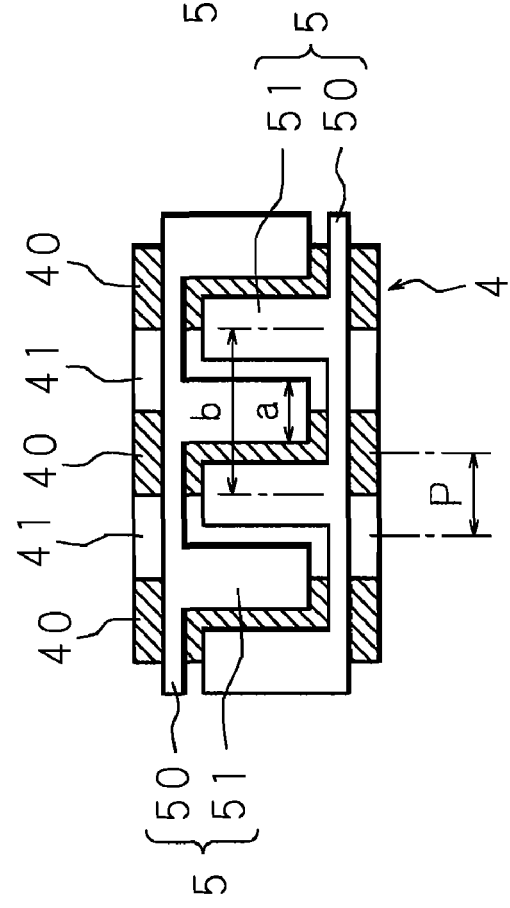

FIGS. 4(a) and 4(b) are explanatory drawings showing a circumferential positional relationship between the magnetic pole nails 51, 51 . . . of the magnetic yoke 5, 5 and the magnetic poles (N-poles 40, 40 . . . and S-poles 41, 41 . . . ) of the cylindrical magnet 4. FIG. 4(a) shows the positional relationship at the time of assembly (neutral position), in which the cylindrical magnet 4 and the magnetic yoke 5, 5 are, as shown therein, circumferentially positioned such that the centerline of the respective magnetic pole nails 51, 51 . . . alternately falls on a boundary between the N-pole 40 and the S-pole 41 circumferentially aligned on the cylindrical magnet 4.

Here, the circumferential of the magnetic pole nails 51, 51 . . . of the magnetic yokes 5, 5, as well as the alignment of the magnetic pole nails 51, 51 . . . are determined based on the magnetization pitch P of the magnetic poles (N-pole 40, 40 . . . and S-pole 41, 41 . . . ) circumferentially aligned on the cylindrical magnet 4, such that the circumferential is slightly smaller than the magnetization pitch P, and the alignment is generally twice as wide as the magnetization pitch P.

Because of the foregoing setting of the alignment, the centerlines of the magnetic pole nails 51, 51 . . . of each of the two magnetic yokes 5, 5 alternately fall on all the boundaries between the N-pole 40 and the S-pole 41 circumferentially aligned on the cylindrical magnet 4, in the neutral position as shown in FIG. 4(a), and because of the foregoing setting of the circumferential width "a", each of the magnetic pole nails 51, 51 . . . located on a boundary between the N-pole 40 and the S-pole 41 occupies generally half the width of the N-pole 40 and the S-pole 41 on the respective sides.

Under such positional relationship at the time of assembly, the magnetic pole nails 51, 51 . . . of the two magnetic yokes 5, 5 are positioned under an equal condition in the magnetic field generated between the adjacently disposed N-pole 40 and S-pole 41 along the circumference of the cylindrical magnet 4. Accordingly, the number of magnetic field lines flowing into and out of those magnetic pole nails 51, 51 . . . become generally equal, and hence the magnetic flux generated on the yoke element 50, 50 connecting the base portions of the magnetic pole nails 51, 51 . . . becomes equal.

The positional relationship thus defined between the magnetic yokes 5, 5 and the cylindrical magnet 4 is changed until the final position as shown in FIG. 4(b) is reached, i.e. until the centerline of the magnetic pole nails 51, 51 . . . is generally aligned with the centerline of the N-pole 40 or S-pole 41 circumferentially aligned on cylindrical magnet 4, in accordance with the relative angular displacement created between the first shaft 1 to which the cylindrical magnet 4 is fixed and the second shaft 2 to which the magnetic yokes 5, 5 are fixed, along with distortion of the torsion bar 3.

During such process, the positional relationship between the magnetic pole nails 51, 51 . . . of each of the two magnetic yokes 5, 5 and the boundary between the N-pole 40 and the S-pole 41 of the cylindrical magnet 4 is shifted in mutually opposite directions, such that overlapping area between the magnetic pole nails 51, 51 . . . of one of the magnetic yokes 5 and the N-pole 40 increases, and also the overlapping area between the magnetic pole nails 51, 51 . . . of the other magnetic yoke 5 and the S-pole 41 increases. Accordingly, magnetic field lines having the opposite polarities are respectively increased on the magnetic pole nails 51, 51 . . . of one of the magnetic yokes 5 and on the magnetic pole nails 51, 51 . . . of the other magnetic yoke 5, and resultantly a positive and a negative magnetic flux are respectively generated on one and the other yoke elements 50.

Under such situation, the positive and negative polarity of the magnetic flux generated on the yoke elements 50, 50 of the magnetic yokes 5, 5 are determined depending on the direction of the relative displacement between the cylindrical magnet 4 and the magnetic yokes 5, 5, created in accordance with the relative angular displacement between the first shaft 1 and the second shaft 2, and the density of the magnetic flux changes in accordance with the increase or decrease in the overlapping area defined between the magnetic pole nails 51, 51 . . . and the N-pole 40 or the S-pole 41 in accordance with the relative displacement.

Now, in the torque detecting apparatus according to the present invention, since the magnetic pole nails 51, 51 . . . of the magnetic yokes 5, 5 are of a rectangular shape of the foregoing dimensions, the overlapping area between the magnetic pole nails 51, 51 . . . and the N-pole 40 or the S-pole 41 increases or decreases generally in proportion to the relative displacement between the cylindrical magnet 4 and the magnetic yoke 5, 5, during the relative displacement therebetween from the neutral position shown in FIG. 4(a) to a point immediately before the final position shown in FIG. 4(b).

Each of the magnetic focusing rings 6, 6 surrounding the outer side of the magnetic yokes 5, 5 thus configured is, as shown in FIG. 1, a circular ring of a magnetic material having a slightly larger inner diameter than the outer diameter of the yoke element 50, and includes magnetic focusing projection 60 formed so as to axially extend from a position along the circumference thereof and bent such that the tip portion is oriented radially outward. The magnetic focusing rings 6, 6 are coaxially positioned such that the bent tip portion of the respective magnetic focusing projections 60, 60 oppose each other with a predetermined gap therebetween, and unified by a molded resin 61 so as to maintain such configuration. The magnetic focusing rings 6, 6 are also fixedly fitted inside a housing H partly shown in FIG. 2 via the molded resin 61, and assembled such that the respective inner circumferential surfaces thereof closely confront the outer circumferential surface of the yoke elements 50, 50 of the corresponding magnetic yokes 5, 5.

Between the magnetic focusing projections 60, 60 of the magnetic focusing rings 6, 6, the magnetic sensor 7 constituted of a magnetosensitive element such as a hall element is interposed. The magnetic sensor 7 is integrally retained in the molded resin 61 with a circuit substrate 70 carrying peripheral circuits such as a power supply circuit and an output processing circuit, and properly positioned in the airgap secured between the magnetic focusing projections 60, 60.

Under such structure, toward the magnetic flux magnetic focusing rings 6, 6 the magnetic flux generated on the yoke elements 50, 50 rotating close to each of the magnetic focusing rings 6, 6 is guided, to be thereby converged at the tip portion of the respective magnetic focusing projections 60, 60 and to leak out into the airgap secured therebetween. At this moment, the magnetic sensor 7 senses the magnetic flux leaking into the airgap, and emits an output corresponding to the density of the leaking magnetic flux. The output is taken up toward outside through the circuit substrate 70.

The magnetic flux density between the magnetic focusing projections 60, 60 varies depending on the magnetic flux generated on the yoke elements 50, 50 corresponding to each of the magnetic focusing rings 6, 6, and the magnetic flux is generated on the yoke elements 50, 50 generally in proportion to the relative displacement thereof between the cylindrical magnet 4 and the magnetic yokes 5, 5, i.e. the relative angular displacement between the first shaft 1 and the second shaft 2, because of adopting the rectangular-shaped magnetic pole nails 51, 51 . . . of the dimensions described above. Accordingly, the output of the magnetic sensor 7 correctly corresponds to the magnitude and direction of the rotational torque applied to the first shaft 1 and the second shaft to thereby create the relative angular displacement, and thus the rotational torque applied to the first shaft 1 and the second shaft 2 can be detected based on the change of the output of the magnetic sensor 7.

Figure 5:
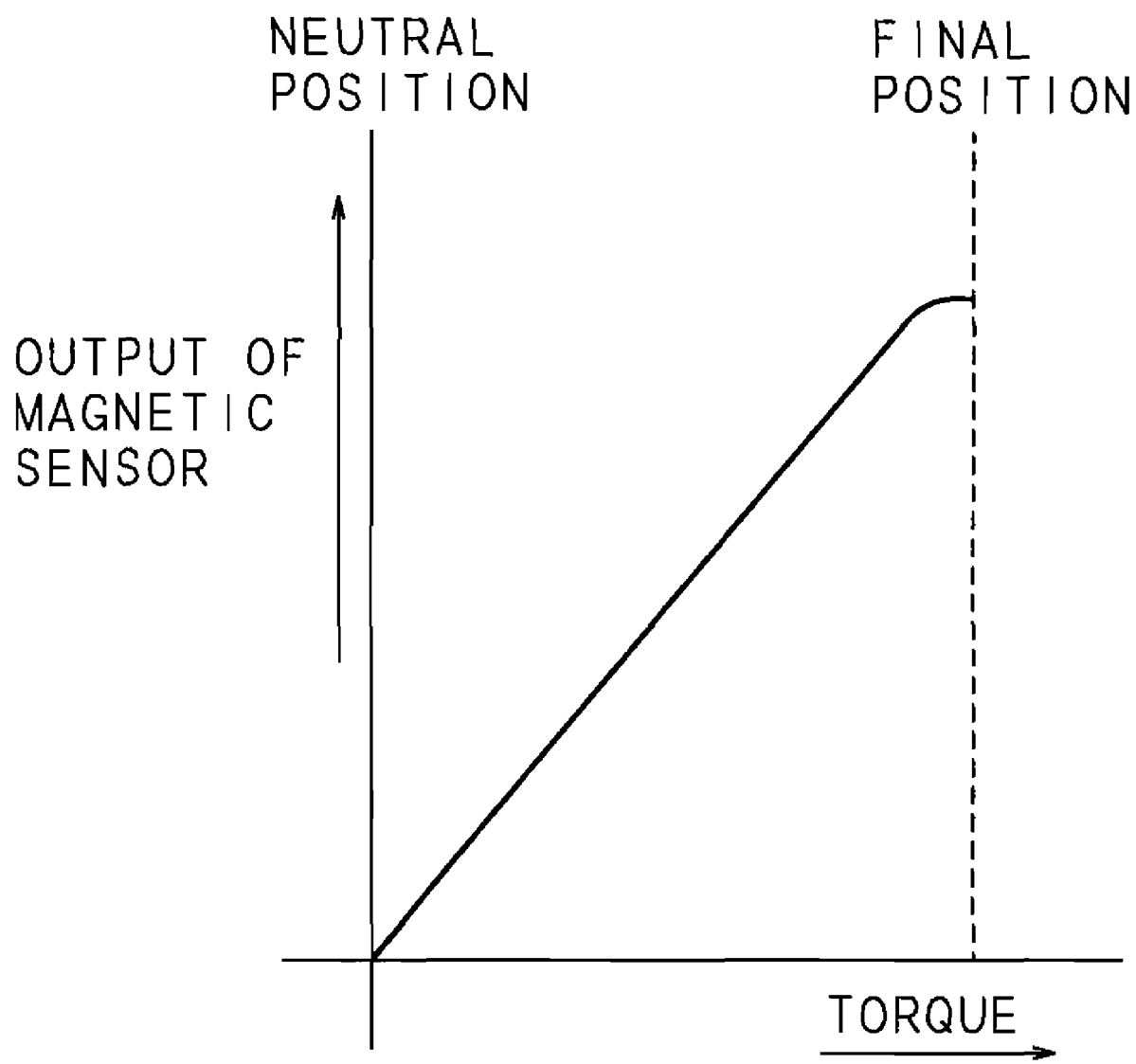
FIG. 5 is a graph showing a relationship between a torque to be detected and an output of a magnetic sensor.
Figure 6A:
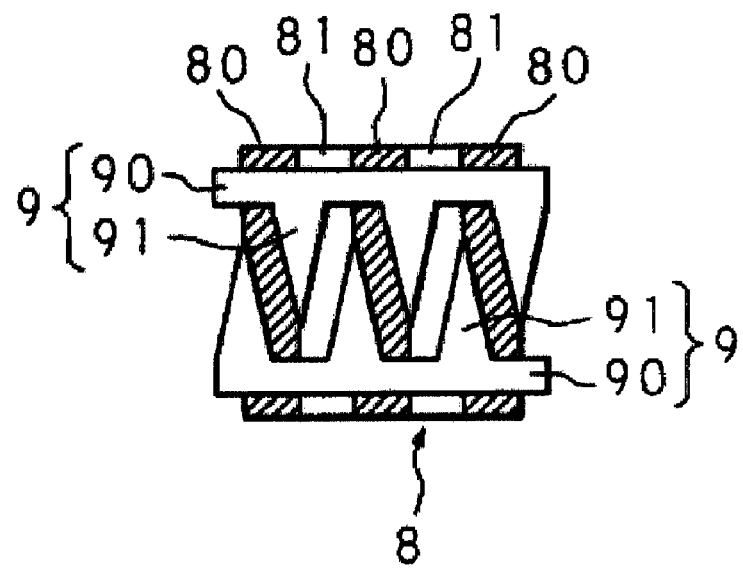
FIGS. 6(*a*) and 6(*b*) are diagrams for explaining an operation of a conventional torque detecting apparatus.
Figure 6B:
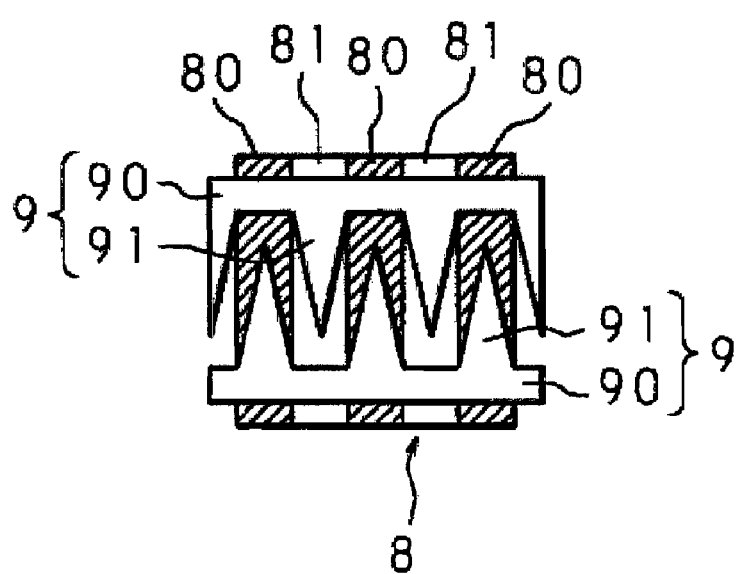
Figure 7:
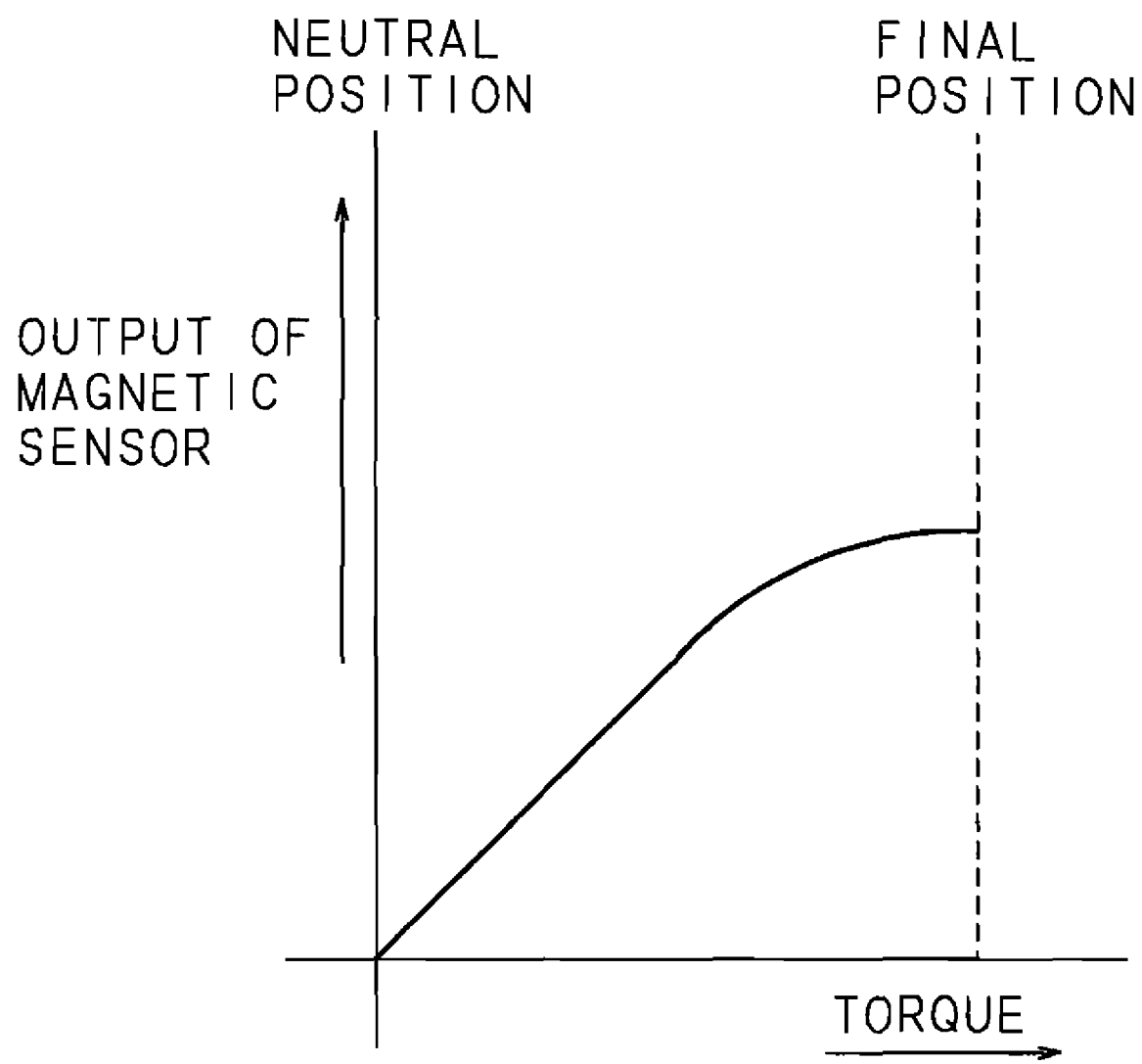
FIG. 7 is a graph showing a relationship between a torque to be detected and an output of a magnetic sensor, in the conventional torque detecting apparatus.

FIG. 5 is a graph showing a relationship between the torque to be detected and the output of a magnetic sensor 7. As shown therein, the output of the magnetic sensor 7 presents a uniform transition over the generally entire range from the neutral position to the final position, such that the output changes generally in proportion to the change of the torque to be detected, and such transition of the output of the magnetic sensor 7 enables detecting the torque with higher accuracy.

Also, whereas the variation of the output of the magnetic sensor 7 is created by the increase or decrease in overlapping area between the magnetic pole nails 51, 51 . . . of the magnetic yokes 5, 5 and the N-pole 40 or the S-pole 41 of the cylindrical magnet 4 in accordance with the relative displacement between the cylindrical magnet 4 and the magnetic yokes 5, 5, in the torque detecting apparatus according to the present invention the increase or decrease of the overlapping area takes place over the entire widthwise length of the rectangular-shaped magnetic pole nails 51, 51 . . . , which allows producing a greater change in output to thereby improve the detection sensitivity, and to minimize degradation in detection accuracy due to an impact of a magnetic noise.

The invention claimed is:

1. A torque detecting apparatus, comprising:
    a first shaft and a second shaft coaxially connected via a torsion bar;
    a cylindrical magnet that integrally rotates with the first shaft, including a plurality of magnetic poles circumferentially aligned in a predetermined magnetization pitch; and
    a set of magnetic yokes that integrally rotate with the second shaft, respectively including a plurality of magnetic pole nails alternately aligned circumferentially in a magnetic field generated on an outer side of the cylindrical magnet;
    wherein the magnetic pole nails are of a rectangular shape having a circumferential width slightly smaller than the magnetization pitch of the cylindrical magnet, and are circumferentially aligned on the magnetic yoke in a pitch generally twice as wide as the magnetization pitch.

2. The torque detecting apparatus as recited in claim 1, wherein a torque is detected in accordance with an overlapping area between the magnetic pole nails and the magnetic poles.

* * * * *